Patented Nov. 17, 1942

2,302,200

UNITED STATES PATENT OFFICE 2,302,200

ART OF PACKING CHEESE

Hubert Fassbender, Kaukauna, Wis., assignor to Milprint, Inc., Milwaukee, Wis., a corporation of Delaware No Drawing. Application August 26, 1940, Serial No. 354,257

2 Claims. (Cl. 99—178)

My invention relates in general to improvements in the art of protecting and packaging certain edible commodities, and relates more specifically to an improved method of treating and wrapping substances such as cheese.

An object of the invention is to provide an improved cheese package, and an improved method of producing such packages in an expeditious and efficient manner.

It has heretofore been proposed to coat comparatively small blocks or cuts of cheese with a relatively flexible layer of material comprising a mixture of wax and rubber in order to protect the external surfaces of the commodity and to maintain the same free from rind or mold formations, and also to maintain the cheese in wholesome condition. One coating substance heretofore proposed which is quite suitable for this purpose comprises a mixture of paraffin and crepe rubber, and a layer of such mixture when applied to a block of rindless cheese will effectively protect the cheese by virtue of the flexibility, non-tackiness, elasticity, moisture resistant, and heat insulating properties of the coating, which may however be readily removed from the cheese either before or after the latter is sliced. This class of coating will not however resist rough handling, and is subject to denting, rupture and stretching, unless the coated block is snugly confined within a durable outer wrapper of some kind. While it has heretofore been customary to wrap or pack the coated cheese blocks in sheet material such as regenerated cellulose or the like, by merely folding and fastening the wrapping sheets about the individual blocks in the ordinary manner, these wrappers were too loosely applied to properly protect the coating surrounding the cheese, and did not prevent undesirable stretching and breakage of the casings during handling and stacking.

It is therefore a more specific object of my present invention to provide a new and useful method of packing blocks of cheese in flexible wax coatings and of snugly confining the coated blocks in outer wrappers in such manner that the coatings will be closely confined about and in intimate contact with the embraced cheese and will not be permitted to stretch.

Another specific object of this invention is to provide an improved method of wrapping coated cheese blocks or the like, in sheet material which is treated so that it will shrink about the enwrapped objects and will thus snugly confine the coatings about the blocks.

A further specific object of the present invention is to provide an improved package containing a block of rindless cheese; and wherein the cheese is effectively protected against possible undesirable exposure by a simple and durable wrapping.

These and other objects and advantages of my invention will be apparent from the following detailed description.

While the invention has been described herein as being especially applicable to blocks of previously aged cheese coated with a paraffin and rubber mixture and finally confined in a wrapper of regenerated cellulose, it is not my desire or intent to thereby unnecessarily restrict the scope or utility of the improvement.

In accordance with my present invention, the cheese which is to be packed is ordinarily aged for any desired length of time, in bulk or relatively large pieces or blocks, and when it is about to be packed for merchandising, the larger cheese may be cut into small blocks or masses which are devoid of rind. Each individual block of cheese is thereafter completely encased, by dipping or otherwise, in a shell or coating of flexible material such as a compound or mixture including paraffin wax and/or resin so modified with rubber, crepe rubber or other rubber derivatives or similar substances to make a resilient flexible coating. In the claims, the term "rubber derivatives" includes any of the materials above mentioned or their equivalents for imparting flexibility. After such casing or coating has been applied and allowed to set, the encased cheese blocks are confined within wrapping sheets each comprising a piece of regenerated cellulose treated in a solution of water, gum arabic and glycerin, whereby the wrapping sheets will be somewhat expanded while moist and will also adhere to each other along overlapped areas. The enwrapped packages or parcels are thereafter permitted to dry, whereupon the wrappers will shrink and will compress the coatings into intimate contact with the surfaces of the cheese blocks where these coatings will be maintained until after the packages are ultimately broken.

This improved method of confining and of wrapping the cheese, produces packages wherein the continuous flexible coatings are snugly compressed against all external surfaces of the blocks, and wherein the inner casings may flex, but cannot stretch and thus produce pockets directly adjoining the cheese blocks. The treatment of the wrapping stock for shrinkage purposes, also makes the overlapping portions of the wrappers sufficiently sticky while moist to cause these portions to adhere and to form tight joints and seals, so that the use of additional adhesive is unnecessary. The regenerated cellulose is also especially adapted for this purpose since it is not air-tight, and will permit necessary breathing and escape of gases; and the individual wrapper sheets may be printed or decorated as desired, before being applied to the coatings, or thereafter. The improved method of packing may be quickly and effectively carried on by hand or with the aid of simple apparatus, and this process has proven highly successful in commercial use and has resulted in the production of vastly improved packages.

It should be understood that it is not desired to limit the invention to the exact steps of the method or to the precise form of package herein described, for various modifications within the scope of the claims may occur to persons skilled in the art.

I claim:

1. The method of packing cheese which comprises, aging cheese in a large mass, segregating the aged cheese mass into small batches, completely coating each batch with a mixture including wax so modified with rubber derivative as to provide a resilient flexible enclosing casing, snugly wrapping each coated batch in an outer protective sheet of regenerated cellulose completely moistened with a water solution of glycerin and gum arabic to slightly expand the sheet and render it capable of shrinkage, each wrapper sheet being closely folded in moist condition around and over the wax coating of each batch with the longitudinal and transverse sheet edge portions overlapping and adhesively coacting along contacting gum arabic treated areas to prevent slippage of the sheet during subsequent shrinkage thereof, and finally drying each batch package to cause the wrapper to shrink and compress the casing against the confined cheese batch while the gum arabic sheet surfacing maintains sealed joints at all of the overlapped wrapper edge portions, the smooth wax coating on the cheese facilitating the shrinking and compressing action by preventing adherence thereto of the gum arabic treated sheet surfaces at the areas of direct contact between the cheese and said wrapper sheet.

2. The method of packing cheese which comprises completely coating a batch of cheese with a mixture including wax so modified with rubber derivative as to provide a resilient flexible enclosing casing, snugly wrapping each coated batch in an outer protective sheet of regenerated cellulose completely moistened with a water solution of glycerin and gum arabic to slightly expand the sheet and render it capable of shrinkage, each wrapper sheet being closely folded in moist condition around and over the wax coating of each batch with the longitudinal and transverse sheet edge portions overlapping and adhesively coacting along contacting gum arabic treated areas to prevent slippage of the sheet during subsequent shrinkage thereof, and finally drying each batch package to cause the wrapper to shrink and compress the casing against the confined cheese batch while the gum arabic sheet surfacing maintains sealed joints at all of the overlapped wrapper edge portions, the smooth wax coating on the cheese facilitating the shrinking and compressing action by preventing adherence thereto of the gum arabic treated sheet surfaces at the areas of direct contact between the cheese and said wrapper sheet.

HUBERT FASSBENDER.